3,657,242
2,6-SUBSTITUTED - 4,5 - DIHYDROPYRIDAZIN(2H)-3-ONES AND 1,3-SUBSTITUTED HEXAHYDRO-PYRIDAZINES
William J. Houlihan, Mountain Lakes, N.J., assignor to Sandoz-Wander, Inc., Hanover, N.J.
No Drawing. Continuation-in-part of application Ser. No. 702,157, Jan. 16, 1968, which is a continuation-in-part of application Ser. No. 680,002, Nov. 2, 1967, which in turn is a continuation-in-part of abandoned application Ser. No. 566,719, July 21, 1966. This application Mar. 17, 1970, Ser. No. 20,434
Int. Cl. C07d 51/04
U.S. Cl. 260—250 A
23 Claims

ABSTRACT OF THE DISCLOSURE 2-($\omega$-hydroxyalkyl)-6-aryl or heterocyclic substituted-4,5-dihydropyridazin(2H)-3-ones or 1-($\omega$-hydroxyalkyl)-3-aryl or heterocyclic substituted-hexahydropyridazines, e.g., 2-(4-hydroxybutyl) - 6 - (2-thienyl)-4,5-dihydropyridazin(2H)-3-one or 1-(4-hydroxybutyl)-3-(2-thenyl)hexahydropyridazine, are prepared by condensing $\omega$-hydrazinoalkanols with aryl or heterocyclic-$\gamma$-ketobutyric acids and are useful as anti-inflammatories.

This application is a continuation-in-part of copending application Ser. No. 702,157 filed Jan. 16, 1968, now abandoned which in turn is a continuation-in- part of copending application Ser. No. 680,002 filed Nov. 2, 1967, U.S. Pat. No. 3,586,687 issued June 22, 1971, which in turn is a continuation-in-part of application Ser. No. 566,-719 filed July 21, 1966 (now abandoned).

This invention relates to 4,5-dihydropyridazin(2H)-3-one and hexahydropyridazines, and more particularly to certain $\omega$-hydroxyalkyl-6-aryl or heterocyclic substituted-4,5-dihydropyridazin(2H)-3-ones and hexahydropyridazines, to methods for preparing the same and to their use as anti-inflammatories.

The compounds of this invention may be represented by the following formula:

$$\underset{(I)}{\begin{array}{c}A\quad B\\ \diagdown\;\diagup\\ \diagup\quad\diagdown\\ \mid\quad\quad N-D\\ \mid\quad\quad\mid\\ \diagdown\quad\diagup N-(CH_2)_n-OH\\ X\end{array}}$$

where
$n$ is a whole integer of from 2 to 6;
X represents $>C=O$ or $-CH_2-$;
B and D each represent hydrogen or together represent a carbon to carbon bond; and
A represents

[three ring structures: a phenyl with $R^1$ and $R^2$ substituents; a 5-membered heterocycle with Y; and another ring with N]

where each
$R^1$ and $R^2$ independently represent hydrogen; halo having an atomic weight of from about 19 to 36; lower alkyl, i.e., alkyl having 1 to 4 carbon atoms, e.g., methyl, ethyl, etc.; lower alkoxy, i.e., alkoxy having 1 to 4 carbon atoms, e.g., methoxy, ethoxy, etc.; trifluoromethyl; or
$R^1$ and $R^2$ together on adjacent carbon atoms represent methylenedioxy; and
Y represents a sulfur or oxygen atoms, provided that when both $R^1$ and $R^2$ represent trifluoromethyl, they are on other than adjacent carbon atoms and that when X is $>C=O$, B and D together represent a carbon to carbon bond; and when X is $-CH_2-$, B and D each represent hydrogen.

The compounds of Formula I in which X is $>C=O$ and B and D together are a carbon to carbon bond are prepared in accordance with the following process:

$$\begin{array}{ccc}
\text{A} & & \text{A} \\
\diagup & \text{NH}_2 & \diagup \\
\diagdown_{COOH} + \mid & \longrightarrow & \diagdown \\
 & \text{NH-(CH}_2\text{)}_n\text{-OH} & \qquad\text{N-(CH}_2\text{)}_n\text{-OH} \\
\text{(II)} & \text{(III)} & \text{O}\quad\text{(Ia)}
\end{array}$$

where $n$ and A and the proviso are as set out above.

The compounds of Formula Ia are prepared by condensing a $\gamma$-ketobutyric acid of Formula II with an $\omega$-hydrazinoalkanol of Formula III in a conventional manner. For example, the condensation may be carried out by heating an intimate mixture of a compound of Formula II and a compound of Formula III at temperatures of from about 60° to 150° C. Preferably, the condensation is carried out in an inert solvent, e.g., toluene, at reflux temperatures, in the presence of an acid catalyst, such as an arylsulfonic acid, e.g., para-toluene sulfonic acid monohydrate. It is also preferred that the water formed during the reaction be removed, for example, by selecting a solvent which forms an azeotrope with water but is water immiscible, thereby permitting use of a Dean-Stark tube to remove the water from the reaction system. While compounds of Formula II, theoretically, react with compounds of Formula III in a molar ratio of 1:1 to form the corresponding compounds of Formula Ia, it is preferred that the condensation be carried out using an excess of the compound of Formula III, e.g., a 10 to 100 mole percent excess of the compound of Formula III. The final product is recovered by conventional techniques, e.g., evaporation and recrystallization.

Compounds of Formula I in which X is $-CH_2-$ and B and D each represent hydrogen are obtained by reduction of the corresponding 2,6-di-substituted-4,5-dihydro-3-(2H)-pyridazinones of Formula Ia in accordance with the following reaction scheme:

$$\begin{array}{ccc}
\text{A} & & \text{A} \\
\diagup & \xrightarrow{[H]} & \diagup \\
\diagdown\quad\text{N-(CH}_2\text{)}_n\text{-OH} & & \diagdown\quad\text{N-(CH}_2\text{)}_n\text{-OH} \\
\text{O}\quad\text{(Ia)} & & \text{(Ib)}
\end{array}$$

where $n$ and A and the proviso are as set out above.

The reduction of pyridazinones of Formula I to the corresponding pyridazines Ib is carried out using a hydride reducing agent, preferably an aluminum hydride, such as lithium aluminum hydride, butyl aluminum hydride, tertiary butyl aluminum hydride and the like. Although the particular reaction conditions are not critical, the reduction is conveniently carried out in the presence of an inert organic solvent at an elevated temperature, e.g., 20° to 150° C., preferably at the reflux temperature of the system. Suitable solvents include ethers, such as tetrahydrofuran, diethyl ether and the like, and mixtures of ethers and benzene or toluene. It is also preferred that the reducing agent be used in a ratio of from 1 to 10 equivalents of reducing agent per equivalent of the compound of Formula Ia. The resulting product Ib is recovered by conventional techniques, e.g., evaporation.

Certain of the compounds of Formulas II and III are known and can be prepared by methods described in the literature. The compounds of Formulas II and III not known can be prepared from known starting materials by methods analogous to those described in the literature for the preparation of known compounds.

The compounds of Formula I are useful because they possess pharmacological activity in animals. In particular, the compounds of Formula I are useful as anti-inflammatory agents, as indicated by their activity in rats using the acute carrageenan-induced edema procedure substantially as described by Winter (Proc. Soc. Exptl. Biol., 111:544, 1962) or by their activity in male Sprague-Dowley rats tested substantially in accordance with the procedure described by Perrine, J. W. and Takesue, E. I. (Arch. Int. Pharmacodyn., 174:192, 1968).

For such use, the compounds may be admixed with conventional pharmaceutical carriers or diluents and administered internally (orally or parenterally) in the form of tablets, capsules, elixirs, solutions, or suspensions. Furthermore, the compounds of Formula Ib may also be administered in the form of their non-toxic pharmaceutically acceptable acid addition salts.

Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

For the above-mentioned use, the dosage administered will, of course, vary depending upon the compound employed, mode of administration and treatment desired. However, in general, satisfactory results are obtained when the compound is administered at a daily dosage of from about 0.3 milligram per kilogram of body weight to about 200 milligrams per kilogram of body weight, preferably given in divided doses 2 to 4 times a day or in sustained release form. For the larger mammals as well as the smaller domestic mammals, total daily dosage is generally from about 20 milligrams to about 1000 milligrams, and dosage forms suitable for internal administration comprise from about 5 milligrams to about 500 milligrams of the compound admixed with a solid or liquid pharmaceutical carrier or diluent.

Pharmaceutical compositions containing said compounds may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract, if desired. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

The preferred pharmaceutical compositions from the standpoint of preparation and ease of administration are solid compositions, particularly hard-filled capsules and tablets containing from about 100 milligrams to about 500 milligrams of the active ingredient.

The following examples serve to further illustrate the present invention. However, it is to be understood that the examples are for purposes of illustration only and are not intended as in any way limiting the scope of the invention which is defined in the appended claims. Furthermore, it is to be understood that the active ingredient used in Examples 10 and 11 can be replaced by any of the other compounds described hereinabove and there are likewise obtained pharmaceutical compositions suitable for the treatment of inflammations.

EXAMPLE 1

1-(3-hydroxypropyl)-3-phenyl-hexahydropyridazine

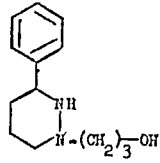

Step A.—2 - (3 - hydroxypropyl)-6-phenyl-4,5-dihydropyridazin(2H)-3-one: To a flask equipped with a condenser, Dean-Stark tube and stirrer is added 44.5 g. (0.25 mole) of 3-benzoylpropionic acid, 27 g. (0.3 mole) of 3-hydrazinopropanol, 1 g. of p-toluenesulfonic acid and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from benzene-pentane (1:2) to obtain 2 - (3 - hydroxypropyl) - 6-phenyl-4,5-dihydropyridazin(2H)-3-one, M.P. 65°–68° C.

Step B.—1-(3-hydroxypropyl)-3-phenyl - hexahydropyridazine: To a flask equipped with a stirrer, condenser, gas inlet tube and Soxhlet tube containing 30.0 g. (0.13 mole) of 2 - (3 - hydroxypropyl)-6-phenyl-4,5-dihydropyridazin(2H)-3-one is added under nitrogen atmosphere 34.4 g. (0.9 mole) of lithium aluminum hydride and 2000 ml. of absolute diethyl ether. The contents of the flask are stirred and refluxed for 80 hours and then cooled in an ice bath. To the cooled mixture is then added dropwise 68.8 ml. of 2 N sodium hydroxide and 103.2 ml. of water. The resulting mixture is then filtered, and the filtrate concentrated on a rotary evaporator to obtain 1-(3-hydroxypropyl)-3-phenyl-hexahydropyridazine as a viscous oil.

EXAMPLE 2

1-(3-hydroxypropyl)-3-(p-chlorophenyl)hexahydropyridazine

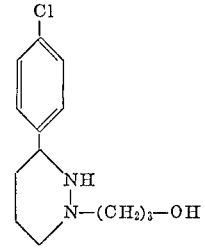

Step A.—2-(3-hydroxypropyl) - 6 - (p-chlorophenyl)-4,5-dihydropyridazin(2H)-3-one: To a flask equipped with a condenser, Dean-Stark tube and stirrer is added 63.9 g. (0.30 mole) of 3-p-chlorobenzoylpropionic acid, 31.5 g. (0.35 mole) of 3-hydrazinopropanol and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from chloroform-pentane (1:2) to obtain 2-(3-hydroxypropyl) - 6 - (p-chlorophenyl)-4,5-dihydropyridazin(2H)-3-one, M.P. 128°–132° C.

Step B.—1-(3-hydroxypropyl) - 3 - (p - chlorophenyl) hexahydropyridazine: To a flask equipped with a stirrer, condenser, gas inlet tube and Soxhlet tube containing 53.4 g. (0.20 mole) of 2-(3-hydroxypropyl)-6-(p-chlorophenyl)-4,5-dihydropyridazin(2H)-3-one is added under nitrogen atmosphere 14.3 g. (0.376 mole) of lithium aluminum hydride and 1500 ml. of absolute diethyl ether. The contents of the flask are stirred and refluxed for 80 hours and then cooled in an ice bath. To the cooled mixture is then added dropwise 28.6 ml. of 2 N sodium hydroxide and 42.9 ml. of water. The resulting mixture is then filtered, and the filtrate concentrated on a rotary evaporator to obtain 1-(3-hydoxypropyl) - 3 - (p-chlorophenyl)-hexahydropyridazine as a viscous oil. The latter solidifies on standing to yield product, M.P. 65°–67° C.

EXAMPLE 3

3-(p-chlorophenyl)-1-(2-hydroxyethyl)hexahydropyridazine

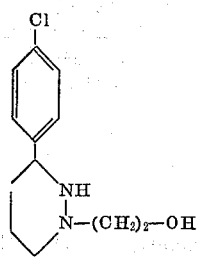

Following the procedure of Example 2A but using 2-hydrazinoethanol in place of the 3-hydrazinopropanol, there is obtained 6-(p-chlorophenyl)-2-(2-hydroxyethyl)-4,5-dihydropyridazin(2H)-3-one; M.P. 120.5°–122.5° C., from methanol-water (1:1).

Following the procedure of Example 2B, but using 6-(p-chlorophenyl) - 2 - (2-hydroxyethyl) - 4,5 - dihydropyridazin(2H)-3-one, there is obtained 3-(p-chlorophenyl)-1-(2-hydroxyethyl)hexahydropyridazine.

EXAMPLE 4

3-(p-chlorophenyl)-1-(4-hydroxybutyl)hexahydropyridazine

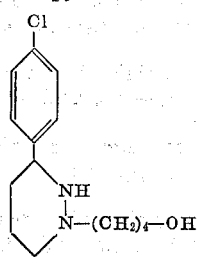

Following the procedure of Example 2A but using 4-hydrazinobutanol in place of the 3-hydrazinopropanol, there is obtained 6-(p-chlorophenyl)-2-(4-hydroxybutyl)-4,5-dihydropyridazin(2H) - 3 - one; M.P. 102°–104° C. from methanol-water (1:1).

Following the procedure of Example 2B, but using 6-(p-chlorophenyl)-2-(4-hydroxybutyl - 4,5 - dihydropyridazin(2H)-3-one in place of the 6-(p-chlorophenyl)-2-(3-hydroxypropyl)-4,5-dihydropyridazin(2H)-3-one, there is obtained 3-(p-chlorophenyl) - 1 - (4-hydroxybutyl)-hexahydropyridazine, as an oil. The oily product is dissolved in ether and saturated with hydrogen chloride to obtain the hydrogen chloride acid addition salt thereof, which is then crystallized from tetrahydrofuran; M.P. 113°–115° C.

EXAMPLE 5

3-(p-fluorphenyl)-1-(3-hydroxypropyl)hexahydropyridazine

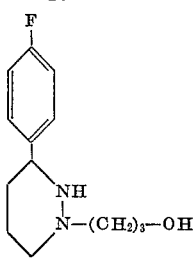

Following the procedure of Example 1A but using 3-(p-fluorobenzoyl)propionic acid in place of the 3-benzoylpropionic acid, there is obtained 6-(p-fluorophenyl)-2-(3-hydroxypropyl) - 4,5 - dihydropyridazin(2H)-3-one, M.P. 105°–106° C., crystallized from methylene chloride-ether (1:1).

Following the procedure of Example 1B, but using 6-(p - fluorophenyl) - 2 - (3-hydroxypropyl)-4,5-dihydropyridazin(2H)-3-one in place of the 2-(3-hydroxypropyl)-6 - phenyl - 4,5 - dihydropyridazin(2H)-3-one, there is obtained 3-(p-fluorophenyl)-1-(3-hydroxypropyl)hexahydropyridazine; M.P. 77.5°–80.5° C., crystallized from chloroform-pentane (1:2).

EXAMPLE 6

3-(3,4-dichlorophenyl)-1-(3-hydroxypropyl)hexahydropyridazine

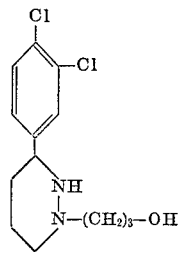

Following the procedure of Example 1A but using 3-(3,4-dichlorobenzoyl)-propionic acid in place of the 3-benzoylpropionic acid, there is obtained 6-(3,4-dichlorophenyl) - 2 - (3 - hydroxypropyl)-4,5-dihydropyridazin(2H)-3-one; M.P. 86°–87° C., crystallized from (1:1) ether-pentane.

Following the procedure of Example 1B, but using 6-(3,4 - dichlorophenyl)-2-(3-hydroxypropyl)-4,5-dihydropyridazin(2H)-3-one in place of the 2-(3-hydroxypropyl)-6 - phenyl - 4,5 - dihydropyridazin(2H)-3-one, there is obtained 3-(3,4-dichlorophenyl)-1-(3-hydroxypropyl)hexahydropyridazine as an oil.

EXAMPLE 7

3-(3,4-dichlorophenyl)-1-(2-hydroxyethyl)hexahydropyridazine

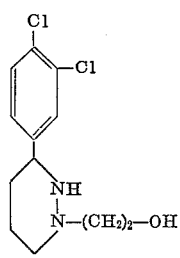

Following the procedure of Example 1A but using 3-(3,4-dichlorobenzoyl)propionic acid and 2-hydrazinoethanol in place of the 3-benzoylpropionic acid and 3-hydrazinopropanol, respectively, there is obtained 6-(3,4-dichlorophenyl)-2-(2-hydroxyethyl)-4,5-dihydropyridazin(2H)-3-one; M.P. 92°–94° C., crystallized from toluene.

Following the procedure of Example 1B, but using 6 - (3,4 - dichlorophenyl) - 2 - (2-hydroxyethyl)-4,5-dihydropyridazin(2H)-3-one in place of the 2-(3-hydroxypropyl)-6-phenyl-4,5-dihydropyridazin(2H)-3-one, there is obtained 3-(3,4-dichlorophenyl)-1-(2-hydroxyethyl)hexahydropyridazine as an oil. The oily product is then dissolved in ether-pentane (1:1) and saturated with hydrogen chloride to obtain the hydrogen chloride acid addition salt thereof as a precipitate. The precipitated salt is collected and recrystallized from ether-pentane (1:1), M.P. 131°–133° C.

EXAMPLE 8

3-(3,4-dichlorophenyl)-1-(4-hydroxybutyl) hexahydropyridazine

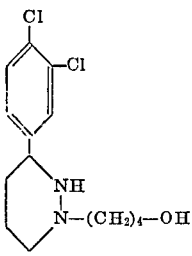

Following the procedure of Example 1A but using 3-(3,4-dichlorobenzoyl)-propionic acid and 4-hydrazinobutanol in place of the 3-benzoylpropionic acid and 3-hydrazinopropanol, respectively, there is obtained 6-(3,4-dichlorophenyl) - 2 - (4 - hydroxybutyl) - 4,5 - dihydropyridazin(2H)-3-one; M.P. 111°–113° C., crystallized from methanol-water (1:1).

Following the procedure of Example 1B, but using 6-(3,4 - dichlorophenyl) - 2 - (4 - hydroxybutyl) - 4,5-dihydropyridazin(2H)-3-one in place of the 2-(3-hydroxypropyl) 6-phenyl-4,5-dihydropyridazin(2H)-3-one, there is obtained 3-(3,4-dichlorophenyl)-1-(4-hydroxybutyl)hexahydropyridazine.

EXAMPLE 9

1-(3-hydroxypropyl)-3-(p-methoxyphenyl) hexahydropyridazine

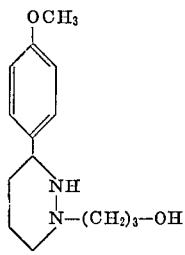

Step A.—2 - (3 - hydroxypropyl) - 6 - (p - methoxyphenyl) - 4,5 - dihydropyridazin(2H)-3-one: To a flask equipped with a condenser, Dean-Stark tube and stirrer is added 20.8 g. (0.10 mole) of 3-p-methoxybenzoylpropionic acid, 13.5 g. (0.15 mole) of 3-hydrazinopropanol and 250 ml. of toluene. The mixture is stirred and refluxed until water ceases to separate in the Dean-Stark tube. The solvent is then removed in vacuo on a rotary evaporator to yield an oil which solidified on standing. The resulting solid material is crystallized from ether-pentane (1:1) to obtain 2-(3-hydroxypropyl) - 6 - (p-methoxyphenyl)-4,5-dihydropyridazin(2H)-3-one, M.P. 72°–75° C.

Step B.—1 - (3 - hydroxypropyl)-3-(p-methoxyphenyl) hexahydropyridazine: To a flask equipped with a stirrer, condenser, gas inlet tube and Soxhlet tube containing 50.0 g. (0.2 mole) of 2 - (3 - hydroxypropyl) - 6-(p-methoxyphenyl)-4,5-dihydropyridazin(2H)-3-one is added under nitrogen atmosphere 14.3 g. (0.376 mole) of lithium aluminum hydride and 1500 ml. of absolute diethyl ether. The contents of the flask are stirred and refluxed for 80 hours and then cooled in an ice bath. To the cooled mixture is then added dropwise 28.6 ml. of 2 N sodium hydroxide and 42.9 ml. of water. The resulting mixture is then filtered, and the filtrate concentrated on a rotary evaporator to obtain 1-(3-hydroxypropyl)-3-(p-methoxyphenyl)hexahydropyridazine as a viscous oil.

EXAMPLE 10

1-(4-hydroxybutyl)-3-(p-methoxyphenyl) hexahydropyridazine

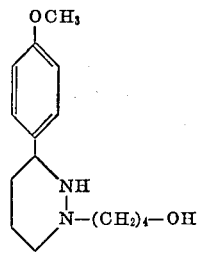

Following the procedure of Example 9A but using 4-hydrazinobutanol in place of the 3-hydrazinopropanol, there is obtained 2-(4-hydroxybutyl)-6-(p-methoxyphenyl)-4,5-dihydropyridazin(2H) - 3 - one; M.P. 55°–58° C. from ether-pentane (1:1).

When 3-(p-toluoyl)propionic acid, 3-(4-trifluoromethylbenzoyl)-propionic acid, 3-(3,4-methylenedioxybenzoyl)propionic acid, 3-(2-furoyl)propionic acid or 3-picolinoylpropionic acid is used in place of 3-(4-methoxybenzoyl)propionic acid in the above process, there is obtained 2-(4-hydroxybutyl)-6-(p-tolyl)-4,5-dihydropyridazin(2H)-3-one, 2-(4-hydroxybutyl)-6-(4-trifluoromethylphenyl)-4,5-dihydropyridazin(2H)-3-one, 2 - (4-hydroxybutyl)-6-(3,4 - methylenedioxyphenyl)-4,5-dihydropyridazin(2H)-3-one, 2-(4-hydroxybutyl)-6-(2-furyl)-4,5-dihydropyridazin(2H)-3-one or 2-(4-hydroxybutyl)-6-(2-pyridyl)-4,5-dihydropyridazin(2H)-3-one, respectively.

Following the procedure of Example 9B, but using 2-(4-hydroxybutyl) - 6 - (p-methoxyphenyl)-4,5-dihydropyridazin(2H)-3-one in place of the 2-(3-hydroxypropyl)-6-(p-methoxyphenyl) - 4,5 - dihydropyridazin(2H)-3-one, there is obtained 1-(4-hydroxybutyl)-3-(p-methoxyphenyl)hexahydropyridazine as an oil.

When 2-(4-hydroxybutyl) - 6 - (p-tolyl)-4,5-dihydropyridazin(2H)-3-one, 2-(4-hydroxybutyl) - 6 - (4-trifluoromethylphenyl)-4,5-dihydropyridazin(2H)-3-one, 2-(4-hydroxybutyl)-6-(3,4 - methylenedioxyphenyl)-4,5-dihydropyridazin(2H)-3-one, 2-(4-hydroxybutyl) - 6 - (2-furyl)-4,5-dihydropyridazin(2H)-3-one or 2-(4-hydroxybutyl)-6-(2-pyridyl)-4,5-dihydropyridazin(2H)-3-one is used in place of 2-(4-hydroxybutyl)-6-(4-methoxyphenyl)-4,5-dihydropyridazin(2H)-3-one in the above process, there is obtained 1-(4-hydroxybutyl)-3-(p-tolyl)hexahydropyridazine, 1-(4-hydroxybutyl) - 3 - (4-trifluoromethylphenyl) hexahydropyridazine, 1-(4-hydroxybutyl)-3-(3,4-methylenedioxyphenyl)hexahydropyridazine, 1 - (4 - hydroxybutyl)-3-(2-furyl)hexahydropyridazine or 1-(4-hydroxybutyl)-3-(2-pyridyl)-4,5-dihydropyridazin(2H)-3-one.

EXAMPLE 11

1-(3-hydroxypropyl)-3-(2-thienyl)hexahydropyridazine

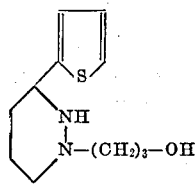

Following the procedure fo Example 1A, but using 3-(2-thenoyl)propionic acid in place of the 3-benzoylpropionic acid there is obtained 2-(3-hydroxypropyl)-6-(2-thienyl)-4,5-dihydropyridazin(2H)-3-one; M.P. 78°–80° C., crystallized from ethyl acetate.

When 3-(2-thenoyl)propionic acid is treated with 2-hydrazinoethanol or 4-hydrazinobutanol in place of 3-hydrazinopropanol in the above process, 2-(2-hydroxyethyl)-6-(2-thienyl)-4,5-dihydropyridazin(2H)-3-one (M.P. 101°–104° C.) or 2-(4-hydroxybutyl)-6-(2-thienyl)-4,5- dihydropyridazin(2H)-3-one (M.P. 78°–80° C.) respectively is obtained on crystallization from (1:1) ether-pentane.

Following the procedure of Example 1B, but using 2-(3-hydroxypropyl) - 6 - (2-thienyl)-4,5-dihydropyridazin-(2H)-3-one in place of the 2-(3-hydroxypropyl)-6-phenyl-4,5-dihydropyridazin(2H)-3-one, there is obtained 1-(3-hydroxypropyl)-3-(2-thienyl)hexahydropyridazine, as an oil boiling at 165°–170° C. at 0.4 mm.

When 2-(2-hydroxyethyl)-6-(2-thienyl)-4,5-dihydropyridazin(2H)-3-one or 2-(4-hydroxybutyl)-6-(2-thienyl)-4,5-dihydropyridazin(2H)-3-one is used in place of 2-(3-hydroxypropyl)-6-(2-thienyl) -4,5-dihydropyridazin(2H)-3-one in the above process, there is obtained 1-(2-hydroxyethyl)-3-(2-thienyl)-hexahydropyridazine or 1-(4-hydroxybutyl)-3-(2-thienyl)hexahydropyridazine, respectively.

EXAMPLE 12

Tablets

Tablets suitable for oral administration and containing the following ingredients are prepared by conventional tabletting techniques.

| Ingredient: | Weight (mg.) |
|---|---|
| 2-(p-chlorophenyl) - 6 - (3-hydroxybutyl)-4,5-dihydropyridazin(2H)-3-one | 250 |
| Tragacanth | 10 |
| Lactose | 197.5 |
| Corn starch | 25 |
| Talcum | 15 |
| Magnesium stearate | 2.5 |

The tablets so prepared are useful in the treatment of inflammations at a dose of one tablet, 2 to 4 times a day, i.e., 500 to 1000 mg. per diem.

EXAMPLE 13

Dry filled capsules

Capsules suitable for oral administration containing the following ingredients are prepared in conventional manner.

| Ingredient: | Weight (mg.) |
|---|---|
| 2-(3-hydroxybutyl - 6 - (2-thienyl)-4,5-dihydropyridazin(2H)-3-one | 500 |
| Inert solid diluent (starch, lactose or kaolin ) | 500 |

The capsules so prepared are useful in the treatment of inflammations at a dose of one capsule, 1 to 2 times a day, i.e., 500 to 1000 mg. per diem.

What is claimed is:

1. A compound of the formula

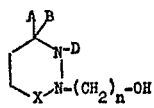

wherein $n$ is a whole integer of from 2 to 6;

X represents $>C=O$ or $-CH_2-$;

B and D each represent hydrogen or together represent a carbon to carbon bond; and A represents

where each $R^1$ and $R^2$ independently represents a hydrogen atom, halo having an atomic weight of from 19 to 36, lower alkyl, lower alkoxy, trifluoromethyl, or $R^1$ and $R^2$ together on adjacent carbon atoms represent methylenedioxy; and Y represents sulfur or oxygen, provided that both $R^1$ and $R^2$ represent trifluoromethyl, they are on other than adjacent carbon atoms and that when X is $>C=O$, B and D together represent a carbon to carbon bond, and when X is $-CH_2-$, B and D each represent hydrogen.

2. A compound of the formula

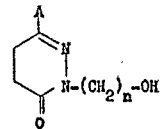

where $n$ and A are as defined in claim 1.

3. The compound of claim 2 which is 2-(3-hydroxypropyl)-6-phenyl-4,5-dihydropyridazin(2H)-3-one.

4. The compound of claim 2 which is 2-(3-hydroxypropyl)-6-(p-chlorophenyl) - 4,5 - dihydropyridazin(2H)-3-one.

5. The compound of claim 2 which is 6-(p-chlorophenyl)-2-(2-hydroxyethyl) - 4,5-dihydropyridazin(2H)-3-one.

6. The compound of claim 2 which is 6-(p-chlorophenyl)-2-(4 - hydroxybutyl)-4,5-dihydropyridazin(2H)-3-one.

7. The compound of claim 2 which is 6-(3,4-dichlorophenyl) - 2 - (3 - hydroxypropyl)-4,5-dihydropyridazin-(2H)-3-one.

8. The compound of claim 2 which is 6-(3,4-dichlorophenyl)-2-(2 - hydroxyethyl) - 4,5 - dihydropyridazin-(2H)-3-one.

9. The compound of claim 2 which is 6-(3,4-dichlorophenyl)-2-(4-hydroxybutyl) - 4,5-dihydropyridazin(2H)-3-one.

10. The compound of claim 2 which is 6-(p-fluorophenyl) - 2 - (3 - hydroxypropyl)-4,5-dihydropyridazin-(2H)-3-one.

11. The compound of claim 2 which is 2-(3-hydroxypropyl) - 6 - (p - methoxyphenyl)-4,5-dihydropyridazin-(2H)-3-one.

12. The compound of claim 2 which is 2-(4-hydroxybutyl)-6-(p - methoxyphenyl) - 4,5 - dihydropyridazin-(2H)-3-one.

13. The compound of claim 2 which is 2-(3-hydroxypropyl)-6-(2-thienyl)-4,5-dihydropyridazin(2H)-3-one.

14. The compound of claim 2 which is 2-(2-hydroxyethyl)-6-(2-thienyl)-4,5-dihydropyridazin(2H)-3-one.

15. The compound of claim 2 which is 2-(4-hydroxybutyl)-6-(2-thienyl-4,5-dihydropyridazin(2H)-3-one.

16. The compound of the formula

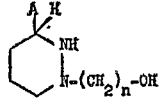

where $n$ and A are as defined in claim 1, or a pharmaceutically acceptable acid addition salt thereof.

17. The compound of claim 16 which is 1-(3-hydroxypropyl)-3-phenyl-hexahydropyridazine.

18. The compound of claim 16 which is 1-(3-hydroxypropyl)-3-(p-chlorophenyl)hexahydropyridazine.

19. The compound of claim 16 which is 3-(p-chlorophenyl)-1-(4-hydroxybutyl)hexahydropyridazine.

20. The compound of claim 16 which is 3-(3,4-dichlorophenyl)-1-(2-hydroxyethyl)hexahydropyridazine.

21. The compound of claim 16 which is 3-(p-fluorophenyl)-1-(3-hydroxypropyl)hexahydropyridazine.

22. The compound of claim 16 which is 1-(3-hydroxypropyl)-3-(p-methoxyphenyl)hexahydropyridazine.

23. The compound of claim 16 which is 1-(3-hydroxypropyl)-3-(2-thienyl)hexahydropyridazine.

References Cited

UNITED STATES PATENTS 2,963,477  12/1960  Druey et al. _____ 260—250 A

NICHOLAS S. RIZZO, Primary Examiner

U.S. Cl. X.R.

424—250